United States Patent [19]

Frye et al.

[11] 4,079,037

[45] Mar. 14, 1978

[54] ALKENYLOXY SILICON COMPOSITIONS

[75] Inventors: Cecil L. Frye; Chi-Long Lee; Myron T. Maxson, all of Midland, Mich.

[73] Assignee: Dow Corning Corporation, Midland, Mich.

[21] Appl. No.: 744,905

[22] Filed: Nov. 26, 1976

[51] Int. Cl.$^2$ .............................................. C08G 77/04
[52] U.S. Cl. ........................... 260/46.5 G; 260/37 SB; 260/46.5 H; 260/46.5 UA; 260/448.8 R
[58] Field of Search ................. 260/46.5 UA, 46.5 G, 260/46.5 H, 448.8 R, 37 SB

[56] References Cited

U.S. PATENT DOCUMENTS

| | | | |
|---|---|---|---|
| 2,394,642 | 2/1946 | Strain et al. | 260/80 |
| 2,396,692 | 3/1946 | Garner | 260/80 |
| 2,438,520 | 3/1948 | Robie et al. | 260/83 |
| 2,481,349 | 9/1949 | Robie | 260/46.5 |
| 2,815,300 | 12/1957 | Smith | 117/103 |
| 2,865,884 | 12/1958 | de Benneville et al. | 260/46.5 |
| 2,909,549 | 10/1959 | Bailey | 260/448.8 |
| 3,383,356 | 5/1968 | Nielsen | 260/46.5 |
| 3,541,044 | 11/1970 | Beers et al. | 260/37 |

*Primary Examiner*—Melvyn I. Marquis
*Attorney, Agent, or Firm*—George A. Grindahl

[57] ABSTRACT

Organosilicon compositions comprising at least one silicon-bonded alkenyloxy radical, such as vinyldimethylcarbonoxy, are disclosed. These unsaturated organosilicon compositions are useful as partial or complete replacements for the analogous organosilicon compositions bearing the well-known silicon-bonded vinyl radical. In particular, vinyldimethylcarbinoxy-endblocked polydimethylsiloxane is useful as a component in an elastomeric composition which is cured with an organosilicon hydride.

23 Claims, No Drawings

ALKENYLOXY SILICON COMPOSITIONS

BACKGROUND OF THE INVENTION

The present invention relates to organosilicon compositions which bear at least one silicon-bonded, aliphatically unsaturated hydrocarbonoxy radical. In one aspect the present invention relates to heat-curable compositions comprising an organosilicon polymer bearing at least one silicon-bonded, aliphatically unsaturated phenoxy or carbonoxy radical and an organosilicon curing agent bearing at least two silicon-bonded hydrogen Organosilicon compositions bearing silicon-bonded alkenyl radicals, such as vinyl, are very useful, such as in a heat-curable composition, and are well known in the silicon polymer art. It is also well known that such compounds are relatively expensive compared to the organosilicon compositions which bear alkoxy and/or hydroxy curing sites and which are well known in moisture-curing compositions. There is a need for a less expensive, aliphatically unsaturated organosilicon composition which is curable with heat and which is stable in the presence of moisture.

Organosilicon compositions bearing the silicon-oxygen-carbon linkage are relatively easy to prepare and certain aliphatically unsaturated hydrocarbonoxy radicals bonded to silicon through an oxygen atom, such as allyloxy and vinyloxy, are well known. Unfortunately, these well-known hydrocarbonoxy radicals are also hydrolytically unstable and, indeed, are useful as hydrolyzable sites in a moisture-curing composition. However, hydrolytic instability of an aliphatically unsaturated hydrocarbonoxy radical is undesirable when said radical is to be used as a permanent radical such as an endblocking radical or when said aliphatic unsaturation is to be used in a heat-curing composition to effect a cure of the composition.

Silicon-containing compositions bearing at least one silicon-bonded alkenyloxy radical wherein the aliphatic unsaturation of the alkenyloxy radical is not adjacent to the alpha carbon of said radical are disclosed by Strain, et al., U.S. Pat. No. 2,394,642; Garner, U.S. Pat. No. 2,396,692; Robie, et al., U.S. Pat. No. 2,438,520; Robie, U.S. Pat. No. 2,481,349; Smith, U.S. Pat. No. 2,815,300; deBenneville, et al., U.S. Pat. No. 2,865,884; Bailey, U.S. Pat. No. 2,909,549, and Beers, et al., U.S. Pat. No. 3,541,044. However, these references disclose neither the organosilicon compositions of this invention nor the heat-curable compositions comprising the alkenyloxy-containing organosilicon compositions of this invention and an organosilicon curing agent bearing at least one silanic hydrogen, i.e. silicon-bonded hydrogen atom.

SUMMARY OF THE INVENTION

It is an object of this invention to provide new organosilicon compositions bearing aliphatically unsaturated carbinoxy radicals which are bonded to silicon through a silicon-oxygen linkage.

It is another object of this invention to provide organosilicon compositions which have terminally unsaturated heat-curing sites which are bonded to silicon by a silicon-oxygen linkage.

It is a further object of this invention to provide heat-curable compositions which have silicon-bonded alkenyloxy radicals which serve as curing sites so that said composition has a heat-curing behavior which is similar to the heat-curing behavior of compositions bearing silicon-bonded vinyl curing sites.

It is also an object of this invention to provide organosilicon polymers having silicon-bonded alkenyloxy radicals which bear aliphatic unsaturation, said polymers being curable when mixed with an organosilicon curing agent bearing silicon-bonded hydrogen atoms.

These and other objects will be obvious to one skilled in the organosilicon art upon consideration of the following disclosure and appended claims.

We have found that certain aliphatically unsaturated radicals of the formula (A) are useful as endblocking radicals and as heat-curing sites in an organosilicon composition because they are not subject to hydrolysis and/or rearrangement to an internal olefin to the extent as are conventional silicon-bonded unsaturated alkenyloxy radicals such as allyloxy. Advantageously, the alkenyloxy silicon compositions of this invention do not lose significant amounts of the alkenyloxy radical by hydrolysis, i.e.

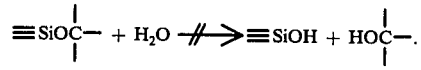

In addition, the alkenyloxy radical does not undergo rearrangement, under conditions of hydrosilylation, to an internal olefin which is less reactive toward silanic hydrogens than a terminal olefin; i.e.

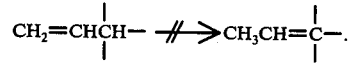

Consequently these organosilicon compositions may be used as endblocked compositions which are stable to moisture-induced changes in molecular weight and as compositions available for further reaction with silanic hydrogen in the well-known manner. Furthermore, the organosilicon polymers of this invention wherein the unsaturated alkenyloxy radical is a vinyldimethylcarbinoxy radical display a curing behavior which is similar to the curing behavior of well-known organosilicon compositions which bear silicon-bonded vinyl radicals as a curing site in a hydrosilylation curing reaction.

DESCRIPTION OF THE INVENTION

The composition of this invention bear at least one silicon-bonded alkenyloxy radical having the formula

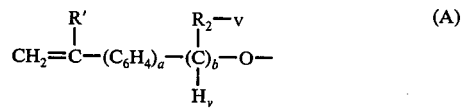

wherein $a$, $b$, $v$, R and R' are hereinafter further defined and limited. Herein the symbol A is sometimes used, for convenience, to denote said alkenyloxy radical.

This invention relates to an organosilicon composition having a plurality of linked silicon atoms and having bonded thereto, by a silicon-oxygen bond, at least one alkenyloxy radical having the formula (A) wherein $a$ has a value of 0 or 1, $b$ has a value of 0 or 1, the sum of $a + b$ has a value of 1 or 2; when $a$ has a value of 1, $v$ has a value of from 0 to 2 and when $a$ has a value of 0, $v$ has a value of 0; each R' is hydrogen or methyl and each R is independently selected from the group consisting of monovalent hydrocarbon radicals having from 1 to 6 carbon atoms, both inclusive; said silicon atoms being linked by at least one linking divalent radical, Q, selected from the group consisting of divalent oxygen atoms, divalent hydrocarbon radicals, divalent hydrocarbon ether radicals, divalent halogenated hydrocarbon radicals and divalent halogenated hydrocarbon ether radicals; any remaining valences of said silicon atoms being satisfied by R" radicals selected from the group consisting of non-linking divalent hydrocarbon radicals and monovalent radicals selected from the group consisting of monovalent hydrocarbon radicals and monovalent halogenated hydrocarbon radicals, there being for every 100 of said silicon atoms, at least one R" radical or A radical.

This invention also relates to a heat-curable composition comprising (I) an organosilicon polymer having a plurality of linked silicon atoms and having bonded thereto, by a silicon-oxygen bond, at least one alkenyloxy radical having the formula (A) wherein $a$, $b$, $a + b$, $v$, R' and R are as hereinabove defined and limited; said silicon atoms being linked by at least one linking divalent radical, Q, hereinabove defined; there being, in addition, an average of from 1 to less than 3 silicon-bonded R" radicals, hereinabove defined, per silicon atom, (II) an organosilicon curing agent comprising at least two silicon-bonded hydrogen atoms per molecule of (II), there being in addition an average of up to two silicon-bonded radicals per silicon atom in (II), said radicals being selected from R" radicals which are free of aliphatic unsaturation, any remaining silicon valences in (II) being satisfied by divalent radicals selected from Q radicals which are free of aliphatic unsaturation, said divalent radicals linking silicon atoms, and (III) an effective amount of a hydrosilylation curing catalyst.

This invention further provides a process for preparing a cured organosilicon composition comprising (i) mixing appropriate amounts of an organosilicon composition (I), an organosilicon curing agent (II) and a hydrosilylation curing catalyst (III) and (ii) heating the mixture of (i) at a sufficient temperature and for a sufficient length of time to increase the molecular weight of (I).

This invention still further provides cured organosilicon compositions which comprise at least one linkage of the formula

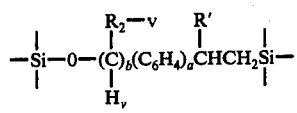

In any radical (A), the values of $a$ and $b$ may be, independently, 0 or 1 provided the sum of $a + b$ is greater than 0. The values of $v$ in any alkenyloxy radical is dependent upon the value of $a$ in that alkenyloxy radical. Thus, in any radical (A) when $a = 1$, $v$ may have a value of from 0 to 2, both inclusive; however, when $a$ is 0 the value of $v$ is limited to 0. That is to say, the silicon-bonded alkenyloxy radical (A) may be selected from the group consisting of $CH_2=CR'CR_2O-$, $CH_2=CR'C_6H_4CR_2O-$, $CH_2=CR'C_6H_4CHRO-$ and $CH_2=CR'C_6H_4CH_2O$. Herein, $C_6H_4$ means any one of any mixture of the ortho, meta, and para phenylene isomers.

In any alkenyloxy radical (A), R' may be either hydrogen or the methyl radical and each R may be independently selected from the group consisting of monovalent hydrocarbon radicals having from 1 to 6 carbon atoms, such as methyl ethyl, propyl, isopropyl, butyl, s-butyl, t-butyl, pentyl, hexyl, cyclohexyl, cyclohexenyl, phenyl, vinyl and allyl. Alkenyloxy radicals of the formula (A) wherein all R radicals are methyl are highly preferred for the organosilicon compositions and the heat-curable compositions of this invention.

Alkenyloxy radicals of the formula (A) which possess optimum hydrolytic stability when bonded to silicon in the compositions of this invention and further possess optimum resistance to rearrangement to an internal olefin are tertiary alkenyloxy radicals of the formulae

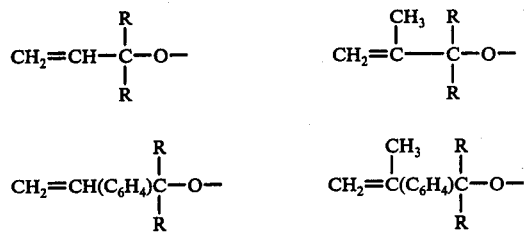

examples of which include, but are not limited to, $CH_2=CHC(CH_3)_2O-$, $CH_2=(CH_3)C(CH_3)_2O-$, $CH_2=CHC_6H_4C(CH_3)_2O-$, $CH_2=CHC(CH_3)(C_2H_5)O-$, $CH_2=C(CH_3)C_6H_4C(CH_3)_2O-$.

Vinyldimethylcarbinoxy, i.e. $CH_2=CHC(CH_3)_2O-$, is a highly preferred alkenyloxy radical in the organosilicon compositions of this invention. The vinyldimethylcarbinoxy radical is of particular value in the organosilicon compositions which are used as components in the heat-curable compositions of this invention because vinyldimethylcarbinoxy, in addition to possessing the optimum resistance to hydrolysis when bonded to silicon and optimum resistance to rearrangement, noted above, also displays a reactivity with silanic hydrogen, i.e. silicon-bonded hydrogen atoms which is nearly identical to the reactivity of the silicon-bonded vinyl radical with silanic hydrogen. Thus, the heat-curable compositions of this invention bearing a vinyldimethylcarbinoxy radical display a curing behavior which is nearly identical to the curing behavior of analogous heat-curable compositions of the art comprising silicon-bonded vinyl radicals and silanic hydrogen atoms. In addition, the properties, such as hydrolytic stability, tensile strength and elongation, of the compositions of this invention which have been cured by a hydrosilylation reaction of silicon-bonded vinyldimethylcarbinoxy radicals with silicon-bonded hydrogen atoms are nearly identical with the corresponding properties of the analogous compositions which have been cured by a hydrosilylation reaction of silicon-bonded vinyl radicals with silicon-bonded hydrogen atoms.

Silicon-bonded alkenyloxy radicals of the formula (A) are therefore suitable for use in organosilicon compositions wherever a silicon-bonded vinyl group has found utility such as endblocking sites of high hydrolytic stability, as sites of aliphatic unsaturation and as sites for further chemical reaction such as curing sites of high hydrolytic stability and good resistance to rearrangement.

The alkenyloxy-bearing organosilicon compositions of this invention may be any silicon-containing composition such as a polysiloxane, a polysilcarbane or a polysiloxane-silcarbane having more than one silicon atom per molecule such as 2, 4, 10, 20, 50, 150, 300, 600, 1500, 3000, 10000, and more silicon atoms and bearing at least one silicon-bonded alkenyloxy radical of the formula (A). Furthermore for every 100 of said silicon atoms there is at least one, silicon-bonded radical selected from the group consisting of A radicals and R" radicals.

Under standard conditions the organosilicon compositions of this invention may exist in various forms such as a liquid, such as a mobile liquid, a viscous liquid and a slowly flowing liquid; or as a solid, such as a crystalline solid, an amorphous solid, a resinous solid, an essentially non-flowing gum, a thermoplastic solid and a thermosetting solid.

The silicon atoms of said organosilicon composition are linked by at least one divalent radical, Q, which may be a divalent oxygen atom or a divalent hydrocarbon radical or a divalent hydrocarbon ether radical or a divalent halogenated hydrocarbon radical or a divalent halogenated hydrocarbon ether radical. It is to be understood that some or all of said silicon atoms may be linked to an adjacent silicon atom by more than one divalent radical. Also, any one or more of the linking divalent radicals may be present in said organosilicon composition.

Silicon-linking divalent radicals, Q, other than divalent oxygen, may contain from 1 to 18 carbon atoms and may be saturated or may contain aliphatic unsaturation or aromatic unsaturation or combinations of aliphatic and aromatic unsaturation. Furthermore, said silicon-linking divalent radicals may be straight chained, branched chained or cyclic, and are bonded to the silicon atoms by silicon carbon bonds. Particularly useful linking divalent hydrocarbon radicals and divalent hydrocarbon ether radicals include —CH$_2$—, —CH$_2$CH$_2$—, —pC$_6$H$_4$—, —mC$_6$H$_4$—, —CH$_2$CH$_2$OCH$_2$CH$_2$—, —CH$_2$CH$_2$OCH$_2$CH$_2$OCH$_2$CH$_2$—, and —pC$_6$H$_4$—O—pC$_6$H$_4$—. Particularly useful linking divalent halogenated hydrocarbon radicals and divalent halogenated hydrocarbon ether radicals include —CH$_2$CH$_2$(C$_n$F$_{2n}$)CH$_2$CH$_2$—, —pC$_6$F$_4$— and —CH$_2$CH$_2$(C$_n$F$_{2n}$)O—(C$_n$F$_{2n}$)CH$_2$CH$_2$— wherein n has a value of from 1 to 10 inclusive such as —CH$_2$CH$_2$CF$_2$CF$_2$CH$_2$CH$_2$— and —CH$_2$CH$_2$CF$_2$OCF$_2$CH$_2$CH$_2$—.

The silicon valences of the organosilicon compositions of this invention which are not satisfied by linking divalent radicals or alkenyloxy radicals of the formula (A) are satisfied by R" radicals selected from non-linking divalent radicals and monovalent radicals, selected from monovalent hydrocarbon radicals and monovalent halogenated hydrocarbon radicals. It is to be understood that the R" radicals in any composition of this invention may be the same or different.

Non-linking divalent hydrocarbon radicals, R", are bonded twice to the same silicon atom by way of two silicon-carbon single bonds and include radicals such as —CH$_2$CH$_2$CH$_2$—, —CH$_2$CH$_2$CH$_2$CH$_2$—, —CH=CHCH$_2$CH$_2$—, —CH$_2$CH=CHCH$_2$—, —CH$_2$C(CH$_3$)=C(CH$_3$)CH$_2$— and —CH$_2$CH$_2$CH$_2$CH$_2$CH$_2$—.

Examples of monovalent hydrocarbon radicals, R", include alkyl radicals such as methyl, ethyl, propyl, isopropyl, butyl, s-butyl, t-butyl, pentyl, hexyl, octyl, and octadecyl; cycloalkyl radicals such as cyclopentyl and cyclohexyl; alkenyl radicals such as vinyl, cyclohexenyl, allyl; aralkyl radicals such as benzyl; alkaryl radicals such as tolyl and xylyl; and aryl radicals such as phenyl, naphthyl and xenyl.

Examples of monovalent halogenated hydrocarbon radicals, R", include 3,3,3-trifluoropropyl; 3-chloropropyl, chlorophenyl, pentafluorophenyl and pentafluorobenzyl.

Preferred R" radicals for the organosilicon compositions of this invention include methyl, ethyl, vinyl, phenyl, and 3,3,3-trifluoropropyl.

A preferred organosilicon composition of this invention is obtained when all of its silicon atoms are linked with only divalent oxygen atoms. The resulting organosilicon composition, generally described as a polysiloxane, has the unit formula

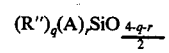

wherein q has an average value of from 0 to less than 3, r has a value of from 0.0001 to 3, the sum of $q + r$ having a value of from 0.001 to 3. Said polysiloxane may be a treated siliceous material wherein $q + r$ has an average value of less than 1 such as an alkenyloxydimethyl-siloxane-treated silica or ground quartz. Said polysiloxane may be a resin, a fluid or a substantially non-flowing gum wherein $q + r$ has a value of from 1 to 3 inclusive.

Polysiloxanes of this invention therefore consist of siloxane units, chemically bonded to each other, which have been selected from the group consisting of SiO$_{4/2}$, —SiO$_{3/2}$, such as R"SiO$_{3/2}$ and ASiO$_{3/2}$; =SiO$_{2/2}$, such as R$_2$"SiO$_{2/2}$, (A)$_2$SiO$_{2/2}$ and R"(A)SiO$_{2/2}$; and ≡SiO$_{1/2}$, such as R$_3$"SiO$_{1/2}$, (A)$_3$SiO$_{1/2}$, R$_2$"(A)SiO$_{1/2}$ and R"(A)$_2$SiO$_{1/2}$ wherein R" and A are as hereinbefore defined.

It is to be understood that the siloxane units of the organosilicon compositions of this invention which bear R" radicals are to be construed in a manner consistent with the divalent or monovalent nature of the particular R" radical that is bonded to silicon. For example, a trifunctional siloxane unit of the formula R"SiO$_{3/2}$ can comprise only R" radicals which are monovalent since only one silicon valence is available for bonding the R" radical. This restriction also holds for R"(A)SiO$_{2/2}$ and R"(A)$_2$SiO$_{1/2}$ siloxane units. However, for siloxane units of the formulae R$_2$"SiO$_{2/2}$, R$_3$"SiO$_{1/2}$ and R$_2$"(A)SiO$_{1/2}$ the multiple silicon valences that are available to bond R" radicals may be filled with a number of monovalent R" radicals equal to the number of available silicon valences or by a lesser number of non-linking, divalent R" radicals; any divalent R" radical requiring two of the available silicon valences for bonding. The same considerations regarding the R" radical nature apply to (B) and to the q valences in (B).

Preferred monofunctional siloxane units in the organosilicon compositions of this invention include, but are not limited to (CH$_3$)$_3$SiO$_{1/2}$, (Vi)(CH$_3$)$_2$SiO$_{1/2}$, (CH$_3$)$_2$(A)SiO$_{1/2}$, (CH$_3$)(C$_6$H$_5$)(A)SiO$_{1/2}$, (CF$_3$CH$_2$CH$_2$)(CH$_3$)— (A)SiO$_{1/2}$, (CH$_3$CH$_2$)(CH$_3$)$_2$SiO$_{1/2}$, (C$_6$H$_5$)(CH$_3$)(CH$_3$CH$_2$)SiO$_{1/2}$, (C$_6$H$_5$)$_2$(A)SiO$_{1/2}$, (Vi)(C$_6$H$_5$)(CH$_3$)SiO$_{1/2}$, (Vi)(CH$_3$)(A)SiO$_{1/2}$, and (Vi)(CF$_3$CH$_2$CH$_2$)(A)SiO$_{1/2}$. Herein, Vi denotes the silicon-bonded vinyl radical.

Preferred difunctional siloxane units in the organosilicon compositions of this invention include, but are not limited to, (CH$_3$)$_2$SiO$_{2/2}$, (C$_6$H$_5$)$_2$SiO$_{2/2}$, (CH$_3$)(C$_6$H$_5$)SiO$_{2/2}$, (CH$_3$)(Vi)SiO$_{2/2}$, (CF$_3$CH$_2$CH$_2$)(CH$_3$)SiO$_{2/2}$, $(CF_3CH_2CH_2)(Vi)SiO_2/_2$, $(CH_3)(CH_3CH_2)SiO_2/_2$, $(CH_3)(A)SiO_2/_2$, $(C_6H_5)(A)SiO_2/_2$, $(Vi)(A)SiO_2/_2$, $(CF_3CH_2CH_2)(A)SiO_2/_2$ and $(CH_3CH_2)(A)SiO_2/_2$.

Preferred trifunctional siloxane units in the organosilicon compositions of this invention include, but are not limited to $CH_3SiO_3/_2$, $C_6H_5SiO_3/_2$, $CF_3CH_2CH_2SiO_3/_2$, $ViSiO_3/_2$, $CH_3CH_2SiO_3/_2$ and $ASiO_3/_2$.

When any of the aforesaid preferred siloxane units bears a vinyldimethylcarbinoxy as the alkenyloxy radical, it is a highly preferred siloxane unit.

Polysiloxanes of this invention wherein more than trace amounts of the siloxane units are selected from the group consisting of tetrafunctional siloxane units, i.e. $SiO_4/_2$ siloxane units, and trifunctional siloxane units, i.e. —$SiO_3/_2$, such as $R''SiO_3/_2$ and $ASiO_3/_2$ are valuable multidimensional polysiloxanes such as branched polysiloxanes, resinous polysiloxanes and siliceous polysiloxanes.

Branched polysiloxanes of the formula (B) include the so-called star-shaped molecules of the general formula

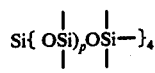

are the so-called Y-shaped molecules of the general formula

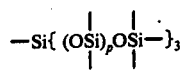

wherein the undesignated silicon valences are satisfied by A radicals and R'' radicals and each $p$, independently has an average value of from 0 to 100 and more. Highly branched polysiloxanes have more than one of said tetrafunctional units and/or trifunctional units per molecule.

Resinous polysiloxanes of the formula (B) are essentially fully condensed, alkenyloxy-containing polysiloxane comprising up to 100 percent of trifunctional siloxane units, any remaining siloxane units being selected from the group consisting of tetrafunctional, difunctional and monfunctional siloxane units, hereinbefore delineated. Exemplary of a resinous polysiloxane of this invention is a benzene-soluble resin consisting essentially of monofunctional siloxane units and tetrafunctional siloxane units in a ratio of from approximately 0.6 to 1 respectively to approximately 0.9 to 1 respectively, wherein at least 95 percent of the radicals bonded to the monofunctional siloxane units are R'' radicals, preferably methyl, and at least one, preferably all, of the remaining radicals which are bonded to the monofunctional siloxane units are A radicals, preferably vinyldimethylcarbinoxy.

Siliceous polysiloxanes of the formula (B) include the alkenyloxy-containing polysiloxanes comprising a majority of $SiO_4/_2$ siloxane units in addition to varying amounts of trifunctional, difunctional and mono-functional siloxane units, hereinbefore delineated. Exemplary of siliceous polysiloxanes are finely divided silicas such as fume silicas, precipitated silicas, xerogels, organogels and ground silicas having an average of from 0.001 to less than one R'' or A radicals per silicon atom. Siliceous polysiloxanes of this invention are particularly useful as a reinforcing filler in the well-known organosilicon elastomeric compositions when the filler is a high surface area silica wich has been treated with R'' radicals and/or A radicals in sufficient quantity to render the filler hydrophobic. These high surface area treated silicas contain from approximately 0.1 to 10 percent, preferably from 1 to 5 percent by weight carbon.

Polysiloxanes of this invention wherein the siloxane units are selected from the group consisting of monofunctional siloxane units, i.e. $=SiO_1/_2$ units and difunctional siloxane units, i.e. $=SiO_2/_2$ siloxane units are valuable cyclic or linear polysiloxanes such as fluids and gums. One or more alkenyloxy radicals of the formula (A) may be bonded to a monofunctional siloxane unit or to a difunctional siloxane unit or to both monofunctional and difunctional siloxane units therein. The remaining valences of said monofunctional and difunctional siloxane units are satisfied by R'' radical, hereinbefore defined.

Cyclic polysiloxanes of the formula (B) have the general formula

wherein $x$ has an average value of from 3 to 15, preferably 3 to 7, and the undesignated silicon valences are filled by at least one A radical, any remaining radicals being R'' radicals. Exemplary of a cyclic polysiloxane of this invention is a cyclotetrasiloxane consisting of dimethylsiloxane units and one or more vinyldimethylcarbinoxymethylsiloxane units.

Linear polysiloxanes of the formula (B) consist essentially of monofunctional siloxane units as endblocking units and difunctional siloxane units as polymer chain units, the resulting molecule having the general average formula $=SiO(=SiO)_{y-2}Si=$ wherein $y$ has an average value equal to or greater than 2, for example, 2, 3, 4, 6, 9, 12, 15, 30, 100, 200, 500, 1000, 5000, and more. One or more alkenyloxy radicals of the formula (A) may be bonded to the silicon atom of one or more monofunctional siloxane units and/or to the silicon atom of one or more difunctional siloxane units in said linear polysiloxanes, any remaining silicon valences being satisfied by R'' radicals.

Preferred linear polysiloxanes of this invention are the polydiorganosiloxanes of the above formula bearing an average of approximately 2 monovalent R'' radicals per silicon atom and an average of from 1 to 10, preferably 2 to 5, alkenyloxy radicals per molecule. In particular, alkenyloxy-endblocked polydiorganosiloxanes of the formula $(A)(R_2''SiO)_{y-1}(R_2''Si)(A)$ wherein $y$ has an average value of from 2 to 5000 and at least 50 percent, and preferably 95 percent, of all R'' radicals are the methyl radical are valuable as an organosilicon polymer component in a heat-curable composition.

The organosilicon compositions of this invention find utility as partial or complete substitutes for the analogous vinyl-containing organosilicon compositions. Furthermore, although the organosilicon compositions of this invention comprising one or more silicon-bonded alkenyloxy radicals (A) may further comprise silicon-bonded alkenyl radicals, such as vinyl, maximum cost advantage is realized if the organosilicon compositions of this invention are free of silicon-bonded alkenyl radicals.

The organosilicon compositions of this invention are useful as intermediates for the preparation of other organosilicon compositions, as moisture-stable fluids, as components such as coreactants in organic compositions or in organosilicon compositions such as curable compositions that give rise to sealants, elastomers, adhesives, coatings, encapsulants, films, primers, moldings, devices, and other compositions well known in the organo-silicon polymer art.

The alkenyloxy-containing organosilicon compositions of this invention may be prepared by any suitable method for preparing alkoxy-containing organosilicon compositions.

In one method for the preparation of alkenyloxy-containing compositions an appropriate alcohol, such as vinyldimethylcarbinol or styrylcarbinol may be reacted with a silicon compound bearing at least one silicon-bonded halogen such as chlorine. It is preferred to use a hydrogen halide scavenger such as triethylamine in the reaction to react with the by-produced hydrogen halide. The resulting alkenyloxysilicon composition may then be separated from the reaction mixture by any suitable means such as by filtration, distillation or fractionation. The halosilicon compound may be a silane such as $SiCl_4$, $C_6H_5SiCl_3$ or $CF_3CH_2CH_2(CH_3)SiCl_2$ thereby giving rise to alkenyloxy halosilanes such as $ASiCl_3$, $(A)_2SiCl_2$, and $C_6H_5(A)SiCl_2$ which are intermediates for the preparation of alkenyloxy organosiloxane compositions such as polysiloxanes and polysiloxanesilcarbanes by way of hydrolysis and condensation with or without other silicon-containing coreactants in the well-known fashion. Preferably non-acidic conditions are maintained during said hydrolysis and condensation. Chlorosilanes are well known and are readily available. The halosilicon compound may be a polysiloxane such as a chlorine-endblocked polydiorganosiloxane to give rise to valuable alkenyloxy-endblocked polydiorganosiloxanes. Chlorine-containing polysiloxanes are disclosed by Patnode, U.S. Pat. No. 2,381,366; Brown, et al., U.S. Pat. No. 3,235,579; and Weyenberg, U.S. Pat. No. 3,268,570 which are hereby incorporated by reference to show the preparation of chlorine-containing polysiloxanes. Silicon-containing compounds bearing hydrolyzable groups other than halogen, such as alkoxy, such as methoxy; amino; amido, such as N-methylacetamido; oximo, such as methylethylketoximo; acyloxy, such as acetoxy; and aminoxy, such as diethylaminoxy may be reacted with an appropriate alcohol to prepare the silicon-alkenyloxy bond. deBenneville, et al., U.S. Pat. No. 2,865,884 discloses the preparation of polyethylenically unsaturated polysiloxanes which may be adapted to prepare the compositions of this invention. Bluestein, U.S. Pat. No. 3,261,807 discloses a method for the preparation of tertiary-alkoxy-containing cyclopolysiloxanes which may be adapted to prepare the compositions of this invention.

In another method for preparing the compositions of this invention alkenyloxy siloxanes of this invention are reacted with organosilicon intermediates, such as cyclic polysiloxanes, under siloxane equilibration and distribution conditions. This method is illustrated in the examples.

Resinous and siliceous alkenyloxy organosilicon compositions may be prepared by adapting the teachings of Daudt, et al., U.S. Pat. No. 2,676,182, Tyler, U.S. Pat. No. 3,015,645, Brown, et al., U.S. Pat. No. 3,334,062, and Smith, U.S. Pat. No. 3,635,743.

This invention further relates to heat-curable compositions. The organosilicon compositions of this invention are useful as the organosilicon polymer (I) in the heat-curable compositions of this invention when said organosilicon composition has an average of from 1 to less than 3 silicon-bonded R" radicals per silicon atom. By heat-curable it is meant herein that the mixture of (I) and (II) can be caused to undergo a hydrosilylation reaction so that an increase in molecular weight of (I) occurs, by heating said mixture to a temperature above room temperature, for example, from approximately 50° to 250° C. Said heating may be done in the presence or absence of moisture, and in the presence or absence of a catalyst (III) for the reaction of silanic hydrogen with silicon-bonded alkenyloxy. It is to be understood that the heat-curable compositions of this invention may also cure without heating, in the presence or absence of moisture, especially when certain platinum-containing catalysts are present.

The organosilicon polymer (I) may be any organosilicon polymer of this invention hereinbefore disclosed such as a polysilcarbane wherein the silicon atoms are linked by only divalent carbon-containing radicals, or a polysiloxane wherein the silicon atoms are linked by only divalent oxygen atoms or a polysiloxanesilcarbane wherein both divalent oxygen atoms and divalent carbon-containing radicals are present as silicon-linking radicals or any suitable mixture of said polysilcarbane, polysiloxane or polysiloxanesilcarbane. The organosilicon polymer (I) may have any of the various forms hereinbefore delineated for the organosilicon compositions of this invention. Organosilicon polymers wherein the R" radicals are selected from the group consisting of methyl, ethyl, phenyl, vinyl, and 3,3,3-trifluoropropyl are preferred. Preferred organo-silicon polymers wherein the alkenyloxy radicals are vinyldimethylcarbinoxy are highly preferred.

Of particular interest as organosilicon polymer (I) are the polysiloxanes of the formula (B) wherein the value of $q$ is further restricted to a value of from 1 to less than 3. The resulting siloxane polymers include the branched polysiloxanes, the resinous polysiloxanes, the cyclic polysiloxanes, and the linear polysiloxanes hereinbefore disclosed.

Diorganosiloxane polymers having an average of two, i.e. from 1.98 to 2.05, monovalent R" radicals per silicon atom in the polymer and from 2 to 5 alkenyloxy radicals per molecule of polymer are useful in the heat-curable compositions of this invention for providing compositions analogous to the well-known elastomeric heat-curable silicone compositions of the art. Said diorganosiloxane polymers advantageously have a viscosity of from 0.1 to 50,000 pascal-seconds at 25° C. Siloxane polymers (I) wherein the viscosity has a value of from 0.1 to 100 pascal-seconds and preferably from 0.1 to 50 pascal-seconds, at 25° C. are useful for providing solvent-free, flowable, heat-curable compositions.

Alkenyloxy-endblocked polydiorganosiloxanes of this invention having the formula

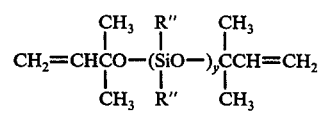

wherein y has an average value of from 50 to 5000 and at least 50 percent, and preferably at least 95 percent, of all R" radicals are methyl, are useful as organosilicon polymer (I) in heat-curable elastomeric compositions. Alkenyloxy-endblocked polydiorganosiloxanes wherein any remaining R" radicals are selected from the group consisting of ethyl, vinyl, phenyl and 3,3,3-trifluoropropyl are valuable as replacements for currently commercial vinyl-endblocked polydiorganosiloxanes.

While it is intended that the organosilicon polymer (I) may contain aliphatically unsaturated radicals, other than alkenyloxy, such as vinyl and allyl, optimum cost advantage is not obtained unless all alkenyl radicals in an organosilicon polymer are replaced by alkenyloxy radicals, such as vinyldimethylcarbinoxy.

Component (II) of the heat-curable compositions of this invention is an organosilicon hydride curing agent having at least two, and preferably more than two, such as from 3 to 75, silanic hydrogens per molecule, i.e. hydrogen atoms which are directly bonded to silicon in (II). The organosilicon hydride curing agent may be a monosilicon compound or a polysilicon compound wherein the silicon atoms are linked by divalent linking radicals, Q'. Examples of Q' radicals include any Q radical, hereinbefore delineated, which is free of aliphatic unsaturation. Polysilicon curing agents thus include polysiloxanes, polysilcarbanes and polysiloxanesilcarbanes. Component (II) may further comprise up to 2 silicon-bonded R''' radicals per silicon atom in (II) wherein R''' is any R", hereinbefore delineated, that is free of aliphatic unsaturation.

Component (II) is preferably a polysiloxane curing agent consisting of siloxane units selected from the group consisting of $SiO_{4/2}$; $HSiO_{3/2}$; $R'''SiO_{3/2}$, such as $CH_3SiO_{3/2}$ and $C_6H_5SiO_{3/2}$; $R_2'''SiO_{2/2}$, such as $(CH_3)_2SiO_{2/2}$, $(CH_3)(CF_3CH_2CH_2)SiO_{2/2}$, $(CH_3)(C_6H_5)SiO_{2/2}$, and $(C_6H_5)_2SiO_{2/2}$; $HR'''SiO_{2/2}$, such as $(H)(CH_3)_2SiO_{2/2}$, $(H)(C_6H_5)SiO_{2/2}$ and $(H)(CF_3CH_2CH_2)SiO_{2/2}$; $HR_2'''SiO_{1/2}$, such as $(H)(CH_3)_2SiO_{1/2}$, $H(CH_3)(C_6H_5)SiO_{1/2}$ and $(H)(CH_3)(CF_3CH_2CH_2)SiO_{1/2}$ and $R_3'''SiO_{1/2}$, such as $(CH_3)_3SiO_{1/2}$, $(CH_3)(C_6H_5)(CH_3CH_2)SiO_{1/2}$ and $(CH_3)_2(CF_3CH_2CH_2)SiO_{1/2}$.

Polysiloxane curing agents may be cyclic, linear or multidimensional. Examples of cyclic polysiloxane curing agents include, but are not limited to,

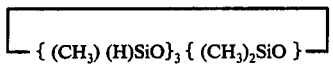

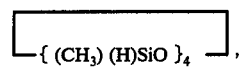

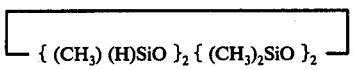

Examples of linear polysiloxane curing agents include, but are not limited to, $(H)(CH_3)_2SiO\{(CH_3)_2SiO\}_{1-10}Si(CH_3)_2(H)$, $(CH_3)_3SiO\{(CH_3)(H)SiO\}_5Si(CH_3)_3$, $(H)(CH_3)_2SiO\{(CH_3)_2SiO\}_2\text{-}\{(CH_3)(H)SiO\}_3\text{-}Si(CH_3)_2(H)$, $(CH_3)_3SiO\{(CH_3)_2SiO\}_3\text{-}\{(CH_3)(H)SiO\}_5\text{-}Si(CH_3)_3$. Examples of multidimensional polysiloxane curing agents include, but are not limited to $\{(H)(CH_3)_2SiO\}_4Si$, $C_6H_5Si\{OSi(CH_3)_2(H)\}_3$, $CH_3Si\{OSi(CH_3)(C_6H_5)(H)\}_3$, a copolymer of $HSiO_{3/2}$ units, $(CH_3)_2SiO_{2/2}$ units and $(CH_3)_3SiO_{1/2}$ units, a copolymer of $CH_3(H)SiO_{2/2}$ units, $CH_3SiO_{3/2}$ units and $(CH_3)_2SiO_{2/2}$ units, a copolymer of $CH_3(H)SiO_{2/2}$ units, $(CH_3)_2SiO_{2/2}$ units, $(CH_3)_3SiO_{1/2}$ units and $SiO_{4/2}$ units, a copolymer of $(CH_3)_2(H)SiO_{1/2}$ units, $(CH_3)_2SiO_{2/2}$ units, $CH_3SiO_{3/2}$ units and $(CH_3)_3SiO_{1/2}$ units and a copolymer of $(CH_3)_2(H)SiO_{1/2}$ units, $(CH_3)_3SiO_{1/2}$ units and $SiO_{4/2}$ units.

Organosilicon hydride curing agents are well known in the organosilicon art and many are commercially available. Component (II) may be prepared by any of the well-known methods for the preparation of organosilicon compounds bearing silicon-bonded hydrogen atoms.

Component III of the heat-curable compositions of this invention is a curing catalyst. Curing catalysts which are suitable for these heat-curable compositions are those well-known catalysts which catalyze the addition of silanic hydrogen atoms to aliphatic unsaturation such as silicon-bonded vinyl. Said catalysts include organic peroxides such as di-tertiary butyl peroxide, tertiary butyl perbenzoate, 2,5-bis(tertiary butyl peroxy)-2,5-dimethylhexane, 2,4-dichlorobenzoyl peroxide and dicumyl peroxide and active metal compounds such as platinum-containing compounds such as platinum deposited on charcol, chloroplatinic acid, disclosed by Speier, et al. U.S. Pat. No. 2,823,218 or the reaction product of chloroplatinic acid with aliphatic unsaturation disclosed by Willing, et al. U.S. Pat. No. 3,419,593.

The heat-curable compositions of this invention may comprise non-essential components which are common in the organosilicon polymer art such as catalyst inhibitors, fillers, pigments, plasticizers, solvents and antioxidants.

Suitable fillers for the heat-curable compositions of this invention include reinforcing fillers, such as high surface silicas, whether untreated, pretreated, or treated in-situ in the well-known manner, including the alkenyloxy-treated silicas of this invention and extending fillers such as ground quartz, diatomaceous earth, asbestos, and glass fibers. Preferably any filter is treated to reduce any destabilizing interaction that may occur between the filler and the other components of the composition.

Suitable catalyst inhibitors such as the well-known acetylenic compounds disclosed by Kookootsedes, et al. in U.S. Pat. No. 3,445,420 may be used in the compositions of this invention to control the room-temperature curing rate of catalyzed compositions thereby providing shelf stability at room temperature.

The heat-curable compositions of this invention will undergo a curing reaction, as defined above, which is a simple increase in the molecular weight of (I) without crosslinking when the sum of the average number of silicon bonded alkenyloxy radicals per molecule of (I) and the average number of silicon-bonded hydrogen atoms per molecular of (II) has the minimum value of 3. Greater totals of alkenyloxy radicals and silanic hydrogen atoms, such as 3.5, 4, 4.2, 5, 10 50, 100 and more will provide greater degrees of cure. The tightness of cure in the compositions of this invention may be controlled in the well-known fashion by varying the number of alkenyloxy radicals and silanic hydrogens in (I) and (II) respectively and by varying the ratio of alkenyloxy radicals in (I) to the silanic hydrogens in (II). Preferably (I) has an average of at least two silicon-bonded alkenyloxy radicals per molecule and (II) has an average of more than two silicon-bonded hydrogen atoms per molecule when crosslinked compositions having strength and rigidity are desired.

The molar ratio of silicon-bonded alkenyloxy radicals to silicon-bonded hydrogen atoms is advantageously approximately 1, e.g. from 0.67 to 1.5 inclusive. Smaller or larger values for said molar ratio, e.g. from 0.1 to less than 0.67 and from more than 1.5 to 10.0 may be used when it is desired to further modify characteristics such as the curing behavior, storability and physical properties of the heat-curable and/or cured composition.

Certain mixtures of (I) and (II) may cure in the absence of any intentionally added catalyst, especially if heated to a high temperature, e.g. 300° C., for more than a brief span of time, e.g. 15 minutes. When used in an effective amount the curing catalyst (III) will provide a reliable cure under moderate conditions, for example from 50° to 250° C., in a reasonable length of time, for example up to 1 hour. The effective amount of a catalyst will depend upon the particular catalyst that is used and the particular curing conditions that are used. Peroxide catalysts may be used in an amount equal to from 0.1 to 10 weight percent, for example, from 0.3 to 3 weight percent based on the weight of the heat-curable composition. Platinum-containing catalysts may be used in an amount equal to from 0.5 to 50, for example, 1 to 20 parts by weight platinum for every one million parts by weight of (I) and (II).

The heat-curable compositions of this invention may be prepared by mixing components (I), (II), and (III) and any other components in any suitable order and in any suitable manner such as milling, blending, dispersing, and in batchwise or continuous manner. Any heating that may be used in the preparation of said heat-curable compositions should be done before components (I) and (II) are mixed. It is preferred that the catalyst (III) be added to the mixture of (I) and (II) in a final step. It is within the scope and spirit of this invention to prepare a first package comprising component (I) and (III) and any other ingredients such as fillers, plasticizers, pigments and inhibitors and a second package comprising component (II) and to mix said first and said second package at some later time such as immediately before the heat-curable composition is to be used.

The heat-curable compositions of this invention cure by way of a hydrosilylation reaction. While not intending to be limited by mechanism theory it is believed that said hydrosilylation reaction proceeds in such a manner as to provide at least one linkage of the formula

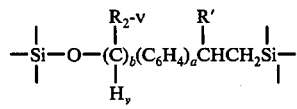

wherein the silicon-hydrogen bond of the organosilicon curing agent is broken and the resulting fragments add to, i.e. bond to, each of the carbon atoms of the terminal double bond of (A) in the fashion indicated.

The cured compositions of this invention are useful as sealants, encapsulating materials, elastomeric materials, dielectric gels and molding compounds.

In order for those skilled in the art to which this invention pertains to practice said invention, the following examples are provided by way of illustration and not by way of limitation. Herein Me denotes methyl, Vi denotes vinyl, GPC denotes gel permeation chromatography and ppm denotes parts per million by weight. Viscosity was measured in centipoise and converted to pascal-seconds (Pa.s) by multiplying by 0.001. Pressure was measured in millimeters of Hg and converted to pascals (Pa) by multiplying by 133.3224 and rounding off. Tensile strength was measured in pounds per square inch and converted to pascals (Pa) by multiplying by 6894.757 and rounding off. Conversion factors were obtained from ASTM Manual E380-72[e]. Durometer was measured according to ASTM D-2240. Tensile strength and elongation were measured according to ASTM D-412.

EXAMPLE 1

One molar part of vinyldimethylcarbinol, previously dried with molecular sieves, and 1.5 molar parts of triethylamine were added to a three-necked flask equipped with a stirrer and addition funnel. All glassware was previously dried at 200° C. for 1 hour. To the above mixture was added, by drops, 0.5 molar parts of Cl(Me$_2$SiO)$_3$Me$_2$SiCl and the resulting mixture was stirred at room temperature for 48 hours. The reaction mixture was then washed with distilled water and the non-aqueous phase was filtered and distilled at reduced pressure to give a 50 percent yield of CH$_2$=CHCMe$_2$O(Me$_2$SiO)$_4$CMe$_2$CH=CH$_2$, b.p. = 100°-103° C./53 Pa. This product contained 0.64 ppm —OH. Its structure was confirmed by infra-red and nuclear magnetic resonance spectroscopy.

EXAMPLE 2

An equal molar mixture of HMe$_2$SiOSiMe$_2$H and CH$_2$=CHCMe$_2$O(Me$_2$SiO)$_4$CMe$_2$CH=CH$_2$, wherein the SiH/alkenyloxy ratio was 1.0, was catalyzed with a small amount of a platinum-containing catalyst. The mixture increased in molecular weight to a high viscosity gum at room temperature which was free of gel particles and was soluble in toluene.

EXAMPLE 3

A mixture of CH$_2$=CHCMe$_2$O(Me$_2$SiO)$_4$CMe$_2$CH=CH$_2$ and an organosilicon curing agent having the average formula Me$_3$SiO(Me$_2$SiO)$_3$(MeHSiO)$_5$SiMe$_3$, wherein said mixture the SiH/alkenyloxy ratio was 1.5, was catalyzed with a small amount of a platinum-containing catalyst. A portion of this mixture cured to a brittle composition within 2 minutes at 150° C. Another portion cured within 60 minutes at room temperature. No gasing was noticed in either case, thereby indicating that the cure did not proceed by a route that liberates hydrogen, such as silanic hydrogen-silanol interaction, but rather by SiH addition to the terminal unsaturation of the alkenyloxy endgroups.

EXAMPLE 4

Preparation of alkenyloxy-endblocked polydimethylsiloxane. All glassware was first baked at 200° C. for 1 hour and all the starting materials were dried with molecular sieves to remove traces of moisture. The reaction vessel was flushed with dry nitrogen and the following equilibration reaction was carried out under a dry nitrogen purge.

Two hundred grams of (Me$_2$SiO)$_x$, $x$ = 4, 5, 6, (2.7 mol of Me$_2$SiO) were added to a three-necked flask which was fitted with a stirrer and condenser and placed in a 60° C. oil bath. Potassium dimethylsilanolate polymerization catalyst was added in sufficient amount to provide one potassium atom for every 1000 silicon atoms in the (Me$_2$SiO)$_x$, followed by 4 grams (0.009 mol) of $CH_2=CHCMe_2O(Me_2SiO)_4CMe_2CH=CH_2$ endblocker from Example 1. The reaction was allowed to proceed, with constant stirring and was monitored by taking periodic samples for GPC and viscosity analysis. After equilibrium was reached, the vessel was removed from the bath and the catalyst was killed by the addition of solid $CO_2$. In subsequent runs the ratio of $(Me_2SiO)_x$ to $CH_2=CHCMe_2O(Me_2SiO)_4CMe_2CH=CH_2$ endblocker was varied and the reaction temperature was increased to 110° C. After the catalyst was killed the polymer was filtered and purified by one of three methods i.e., precipitation from toluene with methanol, vacuum stripping or steam stripping.

Precipitation from Toluene

After the catalyst was killed the polymer was filtered through a 5 micron filter using the pressure method. The use of diatomaceous earth as a prefilter helped prevent the filter from plugging up. The filtered polymer was then dissolved in an equal amount of toluene. If the polymer was high in viscosity it was dissolved in the toluene before filtering. The polymer was precipitated from the toluene mixture by the addition of four parts of methanol to one part of toluene. After separation the polymer was placed in a vacuum oven and dried at 80° C. for 2 hours. (Experiment 1, Table I)

Vacuum Stripping

After the polymer was filtered it was placed in a vacuum apparatus and stripped at 100° C./full pump vacuum for 3 hours. (Experiments 2, 3, 4, and 5, Table I).

Steam Stripping

After the polymer was filtered it was placed into a flask that was fitted with a steam injection port and a vacuum take-off tube. The flask and polymer were heated to 175° C. in an oil bath and 125° C, steam was blown into the polymer. An aspirator vacuum removed the steam. After 30 minutes the steam was shut off and the polymer was further heated under vacuum for an additional 30 minutes. (Experiment 6, Table I)

Table I shows that the molecular weight of the akenyloxy-endblocked polydimethylsiloxane can be controlled by the amount of endblocker that is used. A comparison of Experiments 2 and 6 shows the hydrolytic stability of a vinyldimethylcarbinoxy-endblocked polydimethylsiloxane of this invention.

TABLE I

| Experiment No. | 1 | 2 | 3 | 4 | 5 | 6 |
|---|---|---|---|---|---|---|
| $(Me_2SiO)_x$ (g) | 200 | 200 | 200 | 400 | 2000 | 200 |
| Endblocker (g) | 4 | 8 | 16 | 16 | 80 | 8 |
| Potassium Silanolate (g) | 4.4 | 4.4 | 4.7 | 8.8 | 44.4 | 4.4 |
| Reaction Conditions (°C/hr.) | 63°/43 | 110°/22 | 110°/23 | 110°/26 | 110°/24 | 110°/21 |
| Mol. Wt. Theory | 22,930 | 11,689 | 6,069 | 11,689 | 11,689 | 11,689 |
| Mol. Wt. Measured | 27,000 | 15,000 | 7,800 | 16,325 | 15,949 | 15,580 |
| Viscosity (Pa·s) | 1.69 | 0.52 | 0.15 | 0.45 | 0.46 | 0.57 |
| % Vinyldimethylcarbinoxy | .08 | .26 | .68 | .24 | .28 | .28 |

EXAMPLE 5

A mixture of 10 grams of the polymer from Experiment 4 of Example 4, 0.81 g. of the curing agent and 0.019 g. of the catalyst from Example 3 was stirred at room temperature until the mixture cured to a stiff gel. This reaction occured within one minute after the mixture was formed. An identical mixture using the polymer of Experiment 6 of Example 4 also cured within one minute. When the alkenyloxy-endblocked polymer in the above mixtures was replaced with a methylphenylvinylsiloxane-endblocked polydimethylsiloxane polymer having a viscosity of 0.52 Pa.s a curing time of 13 minutes was noted. This example shows that the vinyldimethylcarbinoxy radical is at least as reactive as the silicon-bonded vinyl radical.

EXAMPLE 6

A mixture of 100 parts by weight of the polymer from Experiment 2 of Example 4, 52 parts by weight of 5 micron ground quartz and 0.29 parts by weight of a platinum-containing catalyst containing 0.63 percent by weight platinum was prepared by hand-mixing the ingredients until a smooth mixture was obtained and then milling the smooth mixture once on a three-roll mill. A similar mixture was prepared using a methylphenylvinylsiloxane-endblocked polydimethylsiloxane having a viscosity of 0.50 Pa.s at 25° C. Both compositions were mixed with a sufficient amount of the curing agent of Example 3 to provide 3.0 silanic hydrogens for every $CH_2=CH-$ group in the composition and the catalyzed samples were press-cured for 15 minutes at 150° C. to give test slabs of cured composition having a thickness of approximately 60 mils. The cured test slabs were tested for tensile strength and elongation. The cured test slabs were further boiled in water for 8 hours and tested as above. The cured test slabs were also post-cured at 150° C. for 8 hours and tested as above. Table II shows that the cured compositions of this invention are similar with regard to physical properties and hydrolytic stability to the cured compositions based on the vinyl-containing polymers of the art.

TABLE II

| | Physical Properties | | |
|---|---|---|---|
| Composition | Tensile (MPa) | Elongation (%) | Durometer |
| Of this Invention | | | |
| Press-Cured (150° C/15 min.) | 1.34 | 153 | 33 |
| Boiled in H₂O (100° C/8 hr.) | 1.27 | 164 | 33 |
| Post-Cured (150° C/8 hr.) | 2.29 | 105 | 42 |
| Of the Art | | | |
| Press-Cured (150° C/15 min.) | 1.59 | 162 | 33 |
| Boiled in H₂O (100° C/8 hr.) | 1.03 | 104 | 35 |
| Post-Cured (150° C/8 hr.) | 2.41 | 98 | 46 |

EXAMPLE 7

A polymer of this invention, having a viscosity of 0.74 Pa.s at 25° C., was prepared from 400 g. of $(Me_2SiO)_x$ and 16 g. of $CH_2=CHCMe_2O(Me_2SiO)_4CMe_2CH=CH_2$ according to Example 1. A mixture was prepared containing 50 parts by weight of this polymer and 0.5 parts by weight of a catalyst containing 0.23 percent by weight platinum. Four 10 g. portions of this mixture were mixed with sufficient curing agent of Example 3 to provide silanic hydrogen/alkenyloxy ratios of 0.4, 0.5, 0.6, and 0.7 and the compositions were heated at 150° C. for 30 minutes. The degree of cure of the resulting gel was measured with a Precision ® one-quarter cone penetrometer. The samples were boiled in water for 4 hours and 8 hours and the degree of cure was measured. Table III shows that these compositions are hydrolytically stable.

TABLE III

| Conditions | Penetrometer Value × 10 (mm) | | | |
|---|---|---|---|---|
| | SiH/CH$_2$=CH— | | | |
| | = 0.4 | = 0.5 | = 0.6 | = 0.7 |
| As Cured (150° C/30 min.) | 9.3 | 5.4 | 2.7 | 1.6 |
| Boiled in H$_2$O (4 hours) | 9.3 | 5.5 | 2.6 | 1.6 |
| Boiled in H$_2$O (8 hours) | 8.9 | 5.4 | 2.6 | 1.5 |

That which is claimed is:

1. An organosilicon composition having a plurality of linked silicon atoms and having bonded thereto, by a silicon-oxygen bond, at least one alkenyloxy radical having the formula

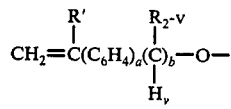

wherein $a$ has a value of 0 or 1, $b$ has a value of 0 or 1, $a + b$ has a value of 1 or 2; when $a$ has a value of 1, $v$ has a value of from 0 to 2 and when $a$ has a value of 0, $v$ has a value of 0; each R' is hydrogen or methyl and each R is independently selected from the group consisting of monovalent hydrocarbon radicals having from 1 to 6 carbon atoms, both inclusive; said silicon atoms being linked by at least one linking divalent radical, Q, selected from the group consisting of divalent oxygen atoms, divalent hydrocarbon radicals, divalent hydrocarbon ether radicals, divalent halogenated hydrocarbon radicals and divalent halogenated hydrocarbon ether radicals; any remaining valences of said silicon atoms being satisfied by R" radicals selected from the groups consisting of non-linking divalent hydrocarbon radicals and monovalent radicals selected from the group consisting of monovalent hydrocarbon radicals and halogenated monovalent hydrocarbon radicals, there being for every 100 of said silicon atoms, at least one R" radical or alkenyloxy radical.

2. An organosilicon composition according to claim 1 wherein all alkenyloxy radicals are vinyldimethylcarbinoxy.

3. An organosilicon composition according to claim 2 consisting essentially of siloxane units.

4. An organosilicon composition according to claim 3 which comprises siloxane units selected from the group consisting of tetrafunctional siloxane units and trifunctional siloxane units.

5. An organosilicon composition according to claim 3 which consists essentially of siloxane units selected from the group consisting of monofunctional siloxane units and difunctional siloxane units.

6. An organosilicon composition according to claim 5 having the formula

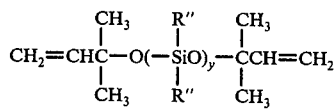

wherein $y$ has an average value of from 2 to 5000 and at least 50 percent of all R" radicals are methyl.

7. An organosilicon composition according to claim 6 wherein at least 95 percent of all R" radicals are methyl, any remaining R" radicals being selected from the group consisting of ethyl, phenyl, vinyl, and 3,3,3-trifluoropropyl.

8. An organosilicon composition according to claim 7 having the formula

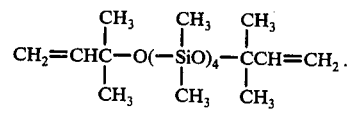

9. A heat-curable composition comprising

I. an organosilicon polymer having a plurality of linked silicon atoms and having bonded thereto, by a silicon-oxygen bond, at least one alkenyloxy radical of the formula

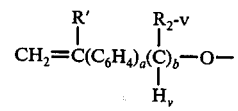

wherein $a$ has a value of 0 or 1, $b$ has a value of 0 or 1, $a + b$ has a value of 1 or 2; when $a$ has a value of 1, $v$ has a value of from 0 to 2 and when $a$ has a value of 0, $v$ has a value of 0; each R' is hydrogen or methyl and each R is independently selected from the group consisting of monovalent hydrocarbon radicals having from 1 to 6 carbon atoms, both inclusive; said silicon atoms in (I) being linked by at least one linking divalent radical, Q, selected from the group consisting of divalent oxygen atoms, divalent hydrocarbon radicals, divalent hydrocarbon ether radicals, divalent halogenated hydrocarbon radicals and divalent halogenated hydrocarbon ether radicals; there being, in addition, an average of from 1 to less than 3 silicon-bonded radicals, R", per silicon atom in (I) said R" radicals being selected from the group consisting of non-linking divalent hydrocarbon radicals and monovalent radicals selected from the group consisting of monovalent hydrocarbon radicals and monovalent halogenated hydrocarbon radicals, II. an organosilicon curing agent comprising at least two silicon-bonded hydrogen atom per molecule of (II), there being in addition an average of up to two radicals, R''', free of aliphatic unsaturation, per silicon atom in (II), said R''' radicals being selected from the group consisting of non-linking divalent hydrocarbon radicals, monovalent hydrocarbon radicals and monovalent halogenated hydrocarbon radicals, any remaining silicon valences in (II) being satisfied by divalent radicals, Q', free of aliphatic unsaturation, selected from the group consisting of divalent oxygen atoms, divalent hydrocarbon radicals, divalent hydrocarbon ether radicals, divalent halogenated hydrocarbon radicals and divalent halogenated hydrocarbon ether radicals, said divalent radicals linking silicon atoms, and an effective amount of III. a hydrosilylation curing catalyst.

10. A heat-curable composition according to claim 9 wherein the alkenyloxy radical is vinyldimethylcarbinoxy.

11. A heat-curable composition according to claim 10 wherein all silicon atoms in (I) are linked by divalent oxygen atoms and all silicon atoms in (II) are linked by divalent oxygen atoms.

12. A heat-curable composition according to claim 11 wherein the organosilicon polymer (I) has the formula

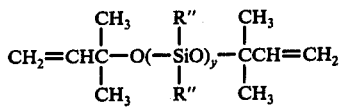

wherein $y$ has an average value of from 50 to 5000 and at least 50 percent of all R'' radicals are methyl.

13. A heat-curable composition according to claim 12 wherein at least 95 percent of all R'' radicals are methyl, any remaining R'' radicals being selected from the group consisting of ethyl, vinyl, phenyl, and 3,3,3-trifluoropropyl.

14. A heat-curable composition according to claim 13 wherein the organosilicon polymer has a viscosity of from 0.1 to 10 pascal-seconds at 25° C. and all R'' radicals are methyl.

15. A heat-curable composition according to claim 11 wherein the organosilicon curing agent (II) has an average of from 3 to 75 silicon-bonded hydrogen atoms per molecule of (II).

16. A heat-curable composition according to claim 14 wherein the organosilicon curing agent consists essentially of an average, per molecule of (II), of 5 $CH_3(H)SiO_{2/2}$ siloxane units, 2 $(CH_3)_3SiO_{1/2}$ siloxane units, and 3 $(CH_3)_2SiO_{2/2}$ siloxane units and the ratio of silicon-bonded hydrogen atoms in (II) to silicon-bonded vinyldimethylcarbonoxy radicals in (I) has a value of from approximately 0.1 to approximately 10.0.

17. A heat-curable composition according to claim 9 obtained by mixing components comprising (I), (II) and an effective amount of a catalyst comprising a platinum-containing compound for the reaction of the silicon-bonded hydrogen atoms with the silicon-bonded alkenyloxy radical.

18. A heat-curable composition according to claim 17 further comprising a filler.

19. A heat-curable composition according to claim 16 obtained by mixing (I), (II) and an effective amount of a catalyst comprising a platinum-containing compound.

20. A process comprising
i. mixing components comprising the mixture of claim 9 and
ii. heating the mixture of (i) until an increase in the molecular weight of (I) is obtained.

21. The cured composition obtained by heating the composition of claim 9.

22. The cured composition obtained by heating the composition of claim 17.

23. The cured composition obtained by heating the composition of claim 19.

* * * * *

UNITED STATES PATENT AND TRADEMARK OFFICE
CERTIFICATE OF CORRECTION

PATENT NO. : 4,079,037
DATED : March 14, 1978
INVENTOR(S) : Cecil L. Frye, et al.

It is certified that error appears in the above-identified patent and that said Letters Patent are hereby corrected as shown below:

Column 1, line 13, after "hydrogen" insert --atom.--

Column 3, line 58, "values" should read --value--.

Column 3, line 66, "of" should read --or--.

Column 4, line 32, the formula "$CH_2=CHC(CH_3)_2O-$" should read -- $CH_2=CHC(CH_3)_2O-$ --.

Column 6, lines 16-19, next to the formula, insert --(B)--.

Column 6, line 60, the formula "$(CF_3CH_2CH_2)(CH_3)-(A)SiO_{1/2}$" should read -- $(CF_3CH_2CH_2)(CH_3)(A)SiO_{1/2}$ --.

Column 11, lines 66-67, the formula "$CH_3Si\{\cdot OSi(CH_3)(C_6H_5)(H)\}_3$" should read -- $CH_3Si\{OSi(CH_3)(C_6H_5)(H)\}_3$ --.

Column 20, Claim 20, "i." and "ii." should read --(i)-- and --(ii)--.

Signed and Sealed this

Fourth Day of November 1980

[SEAL]

*Attest:*

SIDNEY A. DIAMOND

*Attesting Officer*   *Commissioner of Patents and Trademarks*